UNITED STATES PATENT OFFICE.

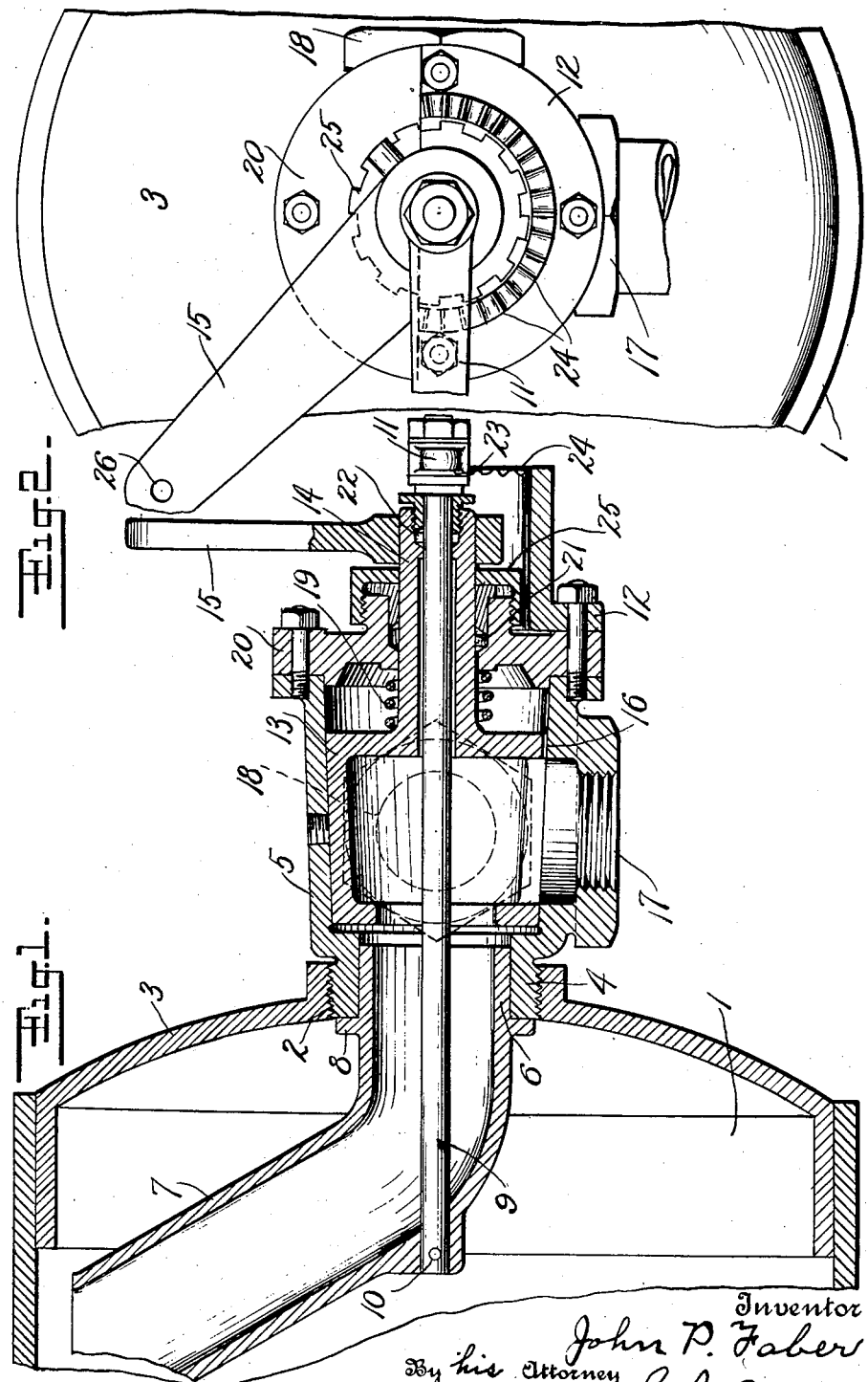

JOHN P. FABER, OF DUNELLEN BOROUGH, NEW JERSEY, ASSIGNOR TO RANSOME CONCRETE MACHINERY COMPANY, OF NEW YORK, N. Y., A CORPORATION OF NEW YORK.

LIQUID MEASURING AND DISCHARGING DEVICE.

1,323,234.     Specification of Letters Patent.     Patented Nov. 25, 1919.

Application filed August 10, 1918. Serial No. 249,221.

*To all whom it may concern:*

Be it known that I, JOHN P. FABER, a citizen of the United States, and a resident of the borough of Dunellen, in the county of Middlesex, State of New Jersey, have invented certain new and useful Improvements in Liquid Measuring and Discharging Devices, of which the following is a specification.

The improvements relate to devices for regulating and controlling the discharge of liquid from a reservoir, and are primarily designed for use in connection with tanks or reservoirs containing water and designed to supply water to a concrete mixing machine.

In machines of this character the amount of water used in the mixing of a batch of concrete depends upon various conditions and is varied according to these conditions. Thus for some work a relatively large quantity of water is used with a given quantity of the dry aggregates, while for other work a relatively small quantity is used, producing what is commonly called a dry mixture. The nature of the dry aggregates, and the particular quantity used in a given batch also require variations in the amount of water used in each batch.

Heretofore various devices have been used for measuring the quantity of water to be supplied to the concrete batch, and these devices have proved satisfactory within certain limits. A common arrangement, and one that has been used for many years, with minor modifications, is the rubber hose outlet tube construction, in which a rubber hose secured at one end of a horizontal tank and extending to a point at or near the other end is provided with an arm for raising and lowering its free end, and thus determining the extent to which water in the tank can be discharged therethrough. This arrangement has been found unsatisfactory in some particulars, and it ordinarily necessitates the placing of the valve controlling the inlet and outlet of water at one end of the tank and the adjusting and measuring means at the other end. It also therefore involves two separate devices for these purposes. To have the measuring device operated from the discharge end of the tank would entail a connection or mechanism of some kind extending to the other end, which would be unsatisfactory for obvious reasons. The use of a three-way valve for the inlet and outlet also has objections, in addition to the apparent one that it in effect reduces the cross sectional area of the pipe, and therefore interferes with the flow of water to a certain extent. There are other objections and disadvantages which need not be mentioned.

With the present improvements the means for controlling the flow and measuring the quantity of water may be combined in a unitary structure, of relatively simple form and very efficient and dependable action, so that the operation of filling the tank, measuring the volume of water to be discharged therefrom and all the other operations incident to the use of the tank may be controlled at a single point, and the other objections and disadvantages of the old construction overcome. It is to overcome the objectionable features of the former construction and arrangement and secure these advantages that the present improvements are designed.

The improvements are illustrated in the accompanying drawings, in which Figure 1 is a vertical medial section of a device embodying the improvements, and Fig. 2 an end elevation of the same.

The liquid tank or reservoir 1 has a central discharge opening 2 in its head 3, into which is threaded the neck 4 of the valve casing 5, and in this neck is fitted the outer end 6 of the curved discharge conduit 7, in such a manner that it may rotate therein. An annular flange 8 prevents the discharge conduit from moving outward.

A means for turning the swiveled discharge regulating conduit 7 is provided in the rod 9, secured by the pin 10 and extending through the valve. On the opposite end of this rod an operating handle 11 is fixed, and a disk 12 adapted to bear dial markings in front of which the handle swings, is secured to the valve casing and enables the operator to measure the movement of the rod and the position of the intake end of the discharge conduit. The arrangement is such that when the operating handle 11 is in its extreme position on the left the intake is also in its uppermost position, and as the handle is moved from that position to the right and over the serrations 24 of the dial the said intake is moved downwardly until it reaches its lowest position. In this position the handle 11 is at the extreme right-hand end of the dial. This arrangement enables the operator to move the discharge pipe through an arc of 180 degrees, from its upper to its lower position, and to gage the quantity of water to be discharged by the dial.

The valve is operated by a handle 15 keyed to the end of the shank 14 of the hollow valve plug 13, by which the said plug may be moved to positions in which its port 16 establishes communication with the discharge orifice 17 or the water supply inlet 18 (dotted lines Fig. 1) of the valve casing 5. The plug is seated within the casing 5, and tapers toward the tank connection, being constantly pressed in this direction by the compression spring 19 on its shank and between the body of the plug and the removable head 20 of the casing, which provides a bearing for the plug and has a stuffing 21 to prevent leakage.

It will be seen that the rod 9 passes through the valve plug and its hollow shank 14 in a straight line and has a bearing in the end of the said tubular shank, in which a stuffing 22 is provided to prevent leakage around the rod. The operating handle 11 is provided with means for holding it in any desired position and preventing accidental movement thereof—as when the valve operating handle 15 is moved—in a spring projection 23 engaging the serrations 24 in the face of the dial. This spring projection may be of any ordinary form suitable for the purpose, and may be secured to the handle 11 in any desired manner. A toothed annulus 25 is also fixed to the casing adjacent to the handle 15, and may be engaged by any suitable device carried by the handle for the purpose of retaining the handle in different positions. The handle is also provided with an aperture 26 at its outer end which may be engaged by a cord or rod so that it can be operated from a distance.

In operation the valve is normally in communication with the water supply pipe, and the tank is therefore normally full, the water entering and filling it to capacity after each draft. The operator determines the volume of water to be drawn and moves the handle 11 accordingly, and then by moving the handle 15 down causes the desired quantity of water to be discharged through the valve to the mixer. The handle 15 is then restored to its original position and the discharge orifice closed and the tank connected with the water supply again. This operation may be repeated as often as desired with or without readjustment of the measuring device, according to the requirements of the mixing work. When it is desired to shut off the water supply without opening the discharge orifice it is only necessary to move the valve handle so as to bring the port 16 opposite the imperforate portion of the valve casing.

What I claim is:

1. The combination with a tank, of a rigid discharge conduit movably mounted therein, and a liquid supply conduit and liquid discharge conduit connected therewith and leading to points exterior to the tank, and a valve between said first discharge conduit and the other conduits and in communication constantly with the first conduit and alternately with the said other conduits, means for moving the valve to positions in which it communicates alternately as stated, means extending through said valve and to the exterior of the tank for moving said first conduit to different positions with respect to the tank, and means for measuring the extent of said movement and the resulting discharge of liquid therethrough.

2. The combination with a tank, of a discharge conduit movably mounted therein, and a liquid discharge conduit communicating therewith and leading to a point exterior to the tank, and a valve between said first discharge conduit and the other conduit and in communication constantly with the first conduit and intermittently with the said other conduit, means for moving the valve, and means for moving a portion of said first conduit to different positions with respect to the tank.

3. The combination with a tank, of a discharge conduit movably mounted therein, and a liquid discharge conduit communicating therewith and leading to a point exterior to the tank, and a valve between said first discharge conduit and the other conduit and in communication constantly with the first conduit and intermittently with the said other conduit, and means for moving the valve, and means for moving said first conduit to different positions with respect to the tank, and means for measuring the extent of said movement and the resulting discharge of liquid therethrough.

4. The combination of a tank having an opening, a casing secured to said opening by a water-tight connection, a rotatable discharge conduit mounted in said casing and extending into the tank, said casing having inlet and outlet ports, a valve device movably mounted in said casing and controlling said ports, said valve device being in communication with said discharge conduit, and means for moving a portion of the discharge conduit to different levels in the tank, said means extending through the said casing to the exterior thereof, and being operable independently of the valve device.

5. The combination with a tank, of a discharge conduit movably mounted therein, and a liquid supply conduit and liquid discharge conduit connected therewith and leading to points exterior to the tank, and a valve between said first discharge conduit and the other conduits and in communication with the first conduit and alternately with the said other conduits, means for moving the valve to positions in which it communicates alternately as stated, means extending to the exterior of the tank for moving said first conduit to different positions with respect to the tank, and means for measuring the extent of said movement and the resulting discharge of liquid therethrough.

Witness my hand this 24th day of July, 1918, at the city of New York, in the county and State of New York.

JOHN P. FABER.